UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

DIAMIDO BASE.

SPECIFICATION forming part of Letters Patent No. 516,754, dated March 20, 1894.

Application filed December 15, 1893. Serial No. 493,759. (Specimens.) Patented in France April 6, 1892, No. 220,724; in Germany April 6, 1892, No. 66,737, and in England May 17, 1892, No. 9,360.

*To all whom it may concern:*

Be it known that I, JOHANN JAKOB BRACK, a citizen of the Swiss Republic, residing at Basle, Switzerland, have invented new and useful Improvements in the Production of Diamido Bases, (partly patented by the firm L. Durand, Huguenin & Co., of St. Fons, near Lyons, France, Basle, Switzerland, and Hüningen, Germany, in France by Letters Patent of addition, dated April 30, 1892, to Letters Patent No. 220,724, dated April 6, 1892; in England by Letters Patent No. 9,360, dated May 17, 1892, and in Germany by Letters Patent of addition, No. 68,920, dated May 2, 1892, to Letters Patent No. 66,737, dated April 6, 1892;) and I do hereby declare the following to be a full, clear, and exact description of the invention.

This invention relates to the manufacture of new diamido-bases suitable for the production of substantive cotton dyes and obtained by the condensation of one molecule formaldehyde, with one molecule dianisidin and one molecule of the basic hydrochlorate of an aromatic diamido-compound, such, for instance, as basic hydrochlorate of tolidin, basic hydrochlorate of benzidin, basic hydrochlorate of dianisidin, basic hydrochlorate of metaphenylendiamin, basic hydrochlorate of paraphenylendiamin.

By way of examples, I will now describe the mode of preparing some of these new diamido-bases.

I. *Diamido-bases derived from formaldehyde, dianisidin and basic hydrochlorate of metaphenylendiamin or paraphenylendiamin.*—24.4 kilos of dianisidin and 14.4 kilos of basic hydrochlorate of metaphenylendiamin are stirred together with ten kilos of alcohol to form a thick paste, to which paste is then added 7.5 kilos of a forty per cent. formaldehyde solution. The reaction at once takes place under spontaneous heating of the mass. The reaction is completed by heating for several hours, preferably on the water bath, the alcohol employed being recovered by distillation. The reaction product is treated with hot dilute hydrochloric acid, a by-product which is insoluble in hydrochloric acid being separated by filtration, while the new base is dissolved as a hydrochlorate salt and is precipitated in the form of a brown powder by the addition of ammonia. When heated to about 130° centigrade the new base forms a viscous mass which decomposes at a higher temperature. In hot alcohol and benzene it is only slightly soluble, and in ether it is insoluble. The hydrochlorate and sulfate salt of said base dissolve readily in water. The nitrite used for diazotizing corresponds approximately to the two amido-groups of the following formula:

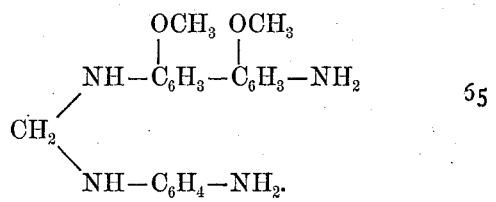

The diazo-compound, soluble in water, forms with alpha-naphtol-alpha-sulfo acid a substantive cotton die, whose color on cotton is distinguished by a pure greenish blue shade and which dissolves in concentrated sulfuric acid with a green blue color. If in the example described the basic hydrochlorate of metaphenylendiamin is replaced by the same quantity of basic hydrochlorate of paraphenylendiamin, there will be obtained as a new diamido-base or condensation product, a black-brown powder which, at the temperature of the water bath, forms a resin-like substance. It is soluble in hot alcohol, only slightly soluble in benzole and insoluble in ether. Its hydrochlorate and sulfate salts are readily soluble in water. The diazo-compound is soluble in water and forms with alpha-naphtol-alpha-sulfo-acid, a substantive coloring matter that dyes unmordanted cotton a blue-violet color; the solution in concentrated sulfuric acid is grayish blue.

II. *Diamido-base derived from formaldehyde, dianisidin and basic hydrochlorate of dianisidin.*—24.4 kilos of dianisidin and twenty-eight kilos of basic dianisidin hydrochlorate, are incorporated with a sufficient quantity of alcohol to form a thick paste and this paste is then added to seventy-five kilos of a formaldehyde solution of forty per cen After standing for a day at the ordinary temperature, it is heated, preferably on a water bath, for twelve hours. The melt obtained forms a viscous, dark colored mass which, after cooling, frequently does not solidify for some time. The reaction product is heated with rather more than the theoretical quantity of diluted sulfuric acid and the new base is thereby completely dissolved, while the dianisidin, which is not affected by the reaction, is separated by filtration as sulfate of difficult solution. From the sulfate solution the new diamido-base is precipitated by alkalies in the form of light gray, resinous floccules, which soon solidify and assume a darker color. This diamido-base, called "formaldehyde-dianisidin," melts between 75° and 90° centigrade; it dissolves in alcohol and benzene, and is almost insoluble in ether. The sulfate and hydrochlorate of this base are easily soluble in water. If in the above described reaction-mixture, the basic hydrochlorate of dianisidin is replaced by the basic hydrochlorate of tolidin or benzidin an analogous diamido-base is obtained.

The bases above described are insoluble in water.

What I claim as my invention, and wish to secure by Letters Patent, is—

1. The herein described process for the production of diamido-bases, applicable to the manufacture of substantive cotton dies, which consists in condensing, with the aid of heat, one molecule of formaldehyde with one molecule of dianisidin and one molecule of the basic hydrochlorate of an aromatic diamido-compound, as set forth.

2. The herein described process for the production of diamido-bases, which consists in condensing, with the aid of heat, one molecule of formaldehyde with a mixture of one molecule of dianisidin and one molecule of the basic hydrochlorate of an aromatic diamin, as set forth.

3. The process herein described for the production of a diamido-base, which consists in condensing, with the aid of heat, one molecule of formaldehyde with a mixture of one molecule of dianisidin and one molecule of basic hydrochlorate of metaphenylendiamin, as set forth.

4. The described diamido-base, suitable for the manufacture of substantive cotton dyes and derived from formaldehyde, dianisidin and basic hydrochlorate of metaphenylendiamin, which is a brown powder, insoluble in water soluble in hydrochloric acid, only slightly soluble in hot alcohol and benzene, insoluble in ether and which forms salts readily soluble in water, as set forth.

In witness whereof I have hereunto signed my name in the presence of two subscribing witnesses.

JOHANN JAKOB BRACK.

Witnesses:
THEODORE STACHELIN,
AMAND RITTER.